July 1, 1930.  R. E. MAES  1,769,032
TEAT CUP FOR MILKING MACHINES
Filed July 2, 1927

Inventor
Robert E. Maes.
By H. P. Doolittle
Atty.

Patented July 1, 1930

1,769,032

UNITED STATES PATENT OFFICE

ROBERT E. MAES, OF CHICAGO, ILLINOIS, ASSIGNOR TO INTERNATIONAL HARVESTER COMPANY, A CORPORATION OF NEW JERSEY

TEAT CUP FOR MILKING MACHINES

Application filed July 2, 1927. Serial No. 203,088.

This invention relates to milking machines and particularly to a teat cup construction for use in such machines of the suction or vacuum type.

It is the primary object of this invention to provide such a teat cup, including a novel pulsating mechanism in its body for governing the vacuum, such pulsator generally being dependent for such action upon the milk flow from the teat, atmospheric pressure, and a novel spring valve structure, all relatively balanced, whereby harmful overmilking cannot take place.

A further object is to provide a teat cup pulsator structure embodying a minimum number of simple parts, so that its manufacture will not be costly, and, in use, it may be easily kept clean.

Other objects will present themselves to those skilled in this art as the disclosure continues.

Very briefly stated, these desirable objects are accomplished in a teat cup structure embodying an upper teat chamber and a lower milk chamber, the two chambers being communicable by means of an apertured rigid bottom separator piece between the two portions or chambers. Underneath this separator piece is arranged a flexible diaphragm valve embodying a novel spring pressure means for normally urging the diaphragm upwardly to close the aperture in the separator piece to destroy communication between the upper and lower chambers. The teat chamber is in constant communication with atmospheric pressure by means of a pin hole in its wall, and the lower, or milk chamber, is connected with a source of vacuum. By starting the vacuum, the balanced forces already generally mentioned act to milk the cow by a proper pulsating action.

In the accompanying sheet of drawings, illustrating one embodiment which the invention may assume in practice,—

Figure 1:
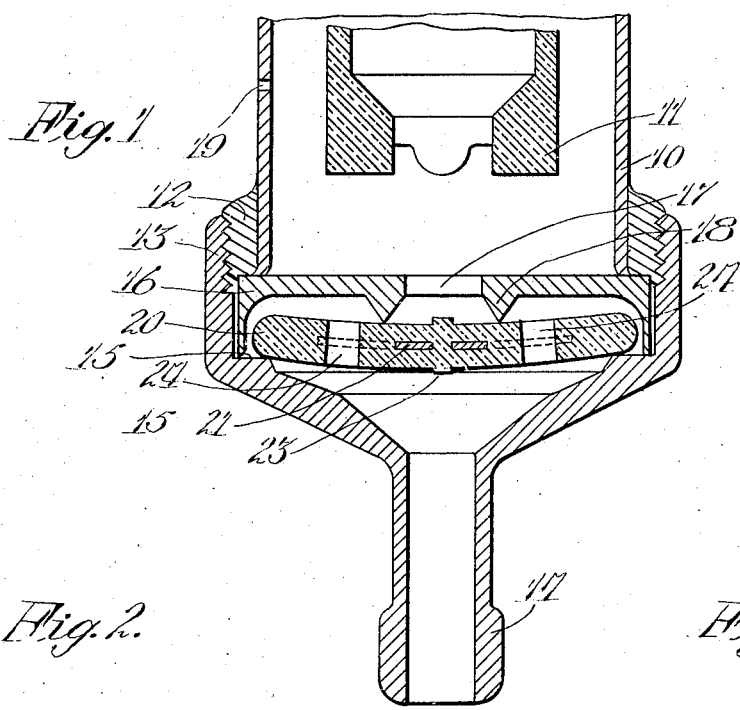
Figure 1 is a vertical central sectional view through the lower portion of the cup, the top of the cup having been omitted, as it is unnecessary to this disclosure.
Figure 2:
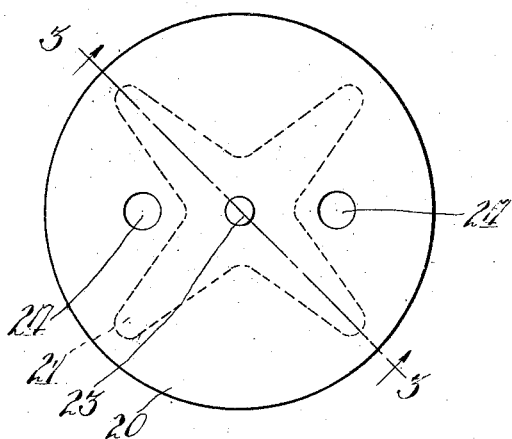
Figure 2 is a plan detail view of the novel diaphragm valve.
Figure 4:
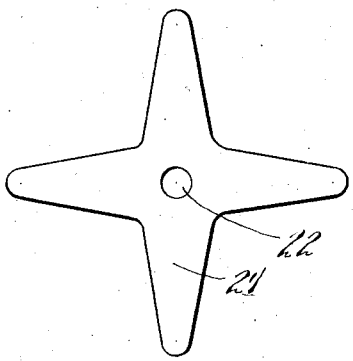
Figure 4 is a plan detail view of the spring per se which actuates the diaphragm.
Figure 3:
Figure 3 is a central sectional view through the diaphragm valve, as seen along the line 3—3 of Figure 2.

The teat cup provided with the improved pulsator structure comprises an elongated, hollow or tubular body 10 in which is supported in any approved manner, a rubber liner 11 for receiving a teat in the usual way. Formed with the lower end of the body 10 is a threaded ferrule 12, the threads being exterior, as shown. A shallow cup-shaped member 13 having a centrally and downwardly extending nipple 14 adapted for connection to any suitable source of vacuum, not shown, is provided with an internal threaded portion at its top to be locked onto the threaded ferrule 12, for securing said chamber or cup member 13 to the body 10. The inside of the cup member 13 is provided with a flat, peripheral ledge 15 upon which loosely rests a separator piece 16, which, when the entire cup is assembled, is locked between said ledge 15 and the ferrule 12, as shown. The piece 16 is rigid and has arranged centrally therein, a milk outlet aperture 17, said piece 16 having on its under side, a depending circular raised edge or wall 18 surrounding the aperture 17. Thus, that portion of the teat cup above the separator piece 16 constitutes the teat chamber, while that portion below the separator piece constitutes the milk chamber. The teat chamber is in constant communication with the atmosphere by means of a pin hole 19 in its wall, as shown.

A novel flexible diaphragm valve member 20 is arranged in the milk chamber, said diaphragm having its peripheral edge lying loosely on the ledge 15. Preferably, the diaphragm is made of a relatively thick piece of rubber molded about a thin, flat, star-shaped, metal spring, insert 21, as shown, said flat spring insert having therein, a central opening 22 through which the rubber will flow to form a locking pin 23 for securing the spring in the exact center of the diaphragm. Milk flow apertures 24 are arranged in the diaphragm between the legs of the spring 21, as shown. The relative positions of ledge 15 and wall 18, respectively engaging the margin and center of the resilient diaphragm 20 on its opposite sides, are preferably such as to slightly depress the center of the diaphram when the parts are assembled, as shown in Figure 1, so that the tension created normally exerts a force holding the diaphragm 20 snugly against the edge 18, thereby closing off the milk outlet 17 from communication with the lower or milk chamber, as will be obvious. When the diaphragm flexes, of course, relative movement must be permitted between the rubber part and the metal spring insert. To permit such movement, the flat spring may be loose in the diaphragm, except for the centering rubber pin part 23.

The mode of operation of the present improved teat cup and pulsator will now be described. The body is applied to the teat of a cow in such a manner that the liner 11 will embrace and engage the teat in the usual way. A hose, not shown, is connected to the nipple 14 and to a source of vacuum, such as a milk can under vacuum, as is customary in this art. The suction will exhaust the air instantaneously from the lower chamber, or milk chamber, as it has been called, and, in view of the fact that the upper chamber above the separator 16 is exposed to the atmosphere by means of the pin hole 19, obviously such atmospheric pressure will immediately be operative through the milk outlet 17 to push down on the top of the diaphragm 20 to flex it downwardly against the force of the flat spring insert 21, thereby permitting the vacuum from the lower or milk chamber to spread rapidly into the upper chamber by way of the holes 24 and aperture 17. The vacuum extends upwardly through the holes 24 past the edge 18 and up through the outlet 17, as can be seen. The suction thus created causes the liner to expand and, as a result, milk flows from the cow's teat. This milk passes downwardly through the milk outlet 17 and onto the diaphragm where it spreads radially outwardly to pass downwardly through the holes 24 in the diaphragm. The suction line exhausts the milk from the lower chamber out the nipple 14.

With the upper chamber thus under vacuum, the diaphragm 20 is in equilibrium with a vacuum thereabove and therebelow, so that the resilient diaphragm 20 is immediately operative to exert its force to seat upwardly against the edge 18 to close the outlet 17. The vacuum in the lower chamber of course continues, while the vacuum in the upper chamber is gradually decreased by the inflow of the atmosphere through the pin hole 19 and the displacing action of the milk flow from the teat until the equilibrium of the diaphragm valve 20 has been completely destroyed, whereupon the action of milk and atmosphere from the top cause the diaphragm slightly to flex down again allowing the milk and air in a decreasing vacuum to spread over the diaphragm faster than it can be drained away through the holes 24. The diaphragm is thereupon forced down quickly. Due to gravity, the milk is drawn off first, but, if the flow of milk and air through the holes 24 is not sufficient to bring the diaphragm in equilibrium again, the milk will flow from the teat uninterrupted. If the milk flows very freely, so that the diaphragm valve remains down to keep the outlet 17 open, the suction is constant as it ought to be, because the milk must be sucked out continuously, when the cow gives it down freely. These pulsations occur intermittently at the rate of substantially 60 to 120 per minute while milk flows slowly, or not at all from the teat, but when the flow of milk increases and the cow gives it down freely, these pulsations become less marked and the diaphragm valve 20, instead of snapping up and down, merely flutters slightly.

The usual cluster of four teat cups may be left on the cow's udder until all teats are milked. It is a well-known fact that all teats of the same udder do not give milk equally at the same rate or at the same time. With the use of the present teat cup, no harm will be done if the teats do not milk alike, as each cup operates entirely independently of the others and automatically has its pulsations controlled by the milk flow. It can thus be seen that with the present teat cup, the cow will be thoroughly and rapidly milked without causing her any injury, as harmful overmilking cannot take place.

The teat cup of this invention, it must now be appreciated, is very simple and, as it is constructed of relatively few parts, it can be easily and cheaply manufactured. Additionally, in use, it can be kept clean and sanitary with a minimum of effort. In cleaning the teat cup, the same is taken apart for this purpose by unscrewing the part 10 from the part 13. This leaves the separator 16 and diaphragm 20 free for easy washing. There are no metallic valves or exposed metallic valve operating means to be corroded by the milk and no intricately shaped parts are present in which particles of dirt can lodge.

Of course, only an illustrative embodiment of this invention has been shown and described, and accordingly it should be understood that the same is capable of variation in structure without departing from the spirit and scope of the invention, as is indicated in the appended claims.

What is claimed is:

1. In a milking machine teat cup, the combination of a body having an opening to the atmosphere, a chamber secured to the body and in communication therewith, a suction connection to the chamber, and a self-restoring diaphragm valve for governing communication between the body and chamber.

2. In a milking machine teat cup, the combination of a body having an opening to the atmosphere, a chamber secured to the body and in communication therewith, a suction connection to the chamber, and a unitary non-metallic diaphragm valve and metallic spring operating means for governing communication between the body and chamber.

3. In a milking machine teat cup, the combination of a body having an opening to the atmosphere, a chamber secured to the body and in communication therewith, a suction connection to the chamber, a rubber diaphragm valve between the body and chamber having a metallic spring insert for causing the diaphragm to govern communication between the body and chamber.

4. In a milking machine teat cup, the combination of a body having an opening to the atmosphere, a chamber secured to the body, said chamber including a suction connection, a separator having an opening therein, said separator having arranged between the body and chamber, a diaphragm in the chamber, and means included in the diaphragm for urging it to close the opening in the separator, said diaphragm having a milk passage therein.

5. In a milking machine teat cup, the combination of a body having an opening to the atmosphere, a chamber secured to the body, said chamber including a suction connection, a separator having an opening therein, said separator being arranged between the body and chamber, an edge encircling the separator opening on its under side, and a diaphragm in the chamber including means for pushing the diaphragm against said edge to close the separator opening, said diaphragm having a milk outlet arranged outside the said separator edge.

6. In a milking machine teat cup, the combination of a body having an opening to the atmosphere, a chamber secured to the body, said chamber having a ledge therein, a suction connection leading from the chamber, a separator provided with an opening, said separator being arranged between the body and chamber, a diaphragm valve lying on said ledge in the chamber, and means for urging the diaphragm to close the separator opening to interrupt communication between the body and chamber.

7. In a milking machine teat cup, the combination of a body having an opening to the atmosphere, a chamber secured to the body, said chamber having a ledge therein, a suction connection leading from the chamber, a separator provided with an opening, said separator being arranged between the body and chamber and having an annular edge on its under side surrounding the opening, a diaphragm lying loosely on the ledge, means for urging the diaphragm against said annular edge to interrupt communication between the body and chamber, and milk passages in the diaphragm.

8. In a milking machine teat cup, the combination of a body including a threaded portion at its lower end, a chamber including an internal ledge, said chamber being threadedly secured to the threaded body portion and having a suction connection, a separator clamped between the body and chamber, said separator having a milk outlet for the body, and a diaphragm valve lying on said ledge in the chamber including means for pressing the diaphragm to close the separator outlet.

9. In a milking machine teat cup, the combination of a body, a chamber detachably secured to said body, said chamber having a suction connection and an internal ledge, a separator having an opening, the separator being arranged between the body and chamber and having on its under side a raised edge surrounding said opening, and a diaphragm valve on said ledge and normally contacting the raised edge.

10. A diaphragm for the purpose described comprising a rubber disk having embedded therein a flat substantially star-shaped metallic spring, and milk passages in the diaphragm between the points of the spring.

11. A diaphragm for the purpose described comprising a rubber disk having loosely embedded therein a flat substantially star-shaped metallic spring, there being a hole in the center of the spring for receiving a rubber pin to lock the spring against displacement, and milk passages in the diaphragm between the points of the spring.

In testimony whereof I affix my signature.

ROBT. E. MAES.

CERTIFICATE OF CORRECTION.

Patent No. 1,769,032.  Granted July 1, 1930, to

ROBERT E. MAES.

It is hereby certified that error appears in the printed specification of the above numbered patent requiring correction as follows: Page 3, line 32, claim 4, for the word "having" read being; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.